United States Patent

Köhn et al.

[11] Patent Number: 5,771,986
[45] Date of Patent: Jun. 30, 1998

[54] BALANCE WITH SCALE ON TOP

[75] Inventors: Heinz-Gerhard Köhn, Dransfeld; Jörg Peter Martens, Bovenden; Michael Laubstein, Göttingen; Carsten Tischer, Hardegsen; Winfried Graf, Göttingen; Eduard Bierich, Hann.-München, all of Germany

[73] Assignee: Sartorius AG, Göttingen, Germany

[21] Appl. No.: 503,484

[22] Filed: Jul. 18, 1995

[30] Foreign Application Priority Data

Jul. 30, 1994 [DE] Germany .......................... 44 27 087.9

[51] Int. Cl.⁶ ................................................ G01G 21/24
[52] U.S. Cl. .................................................. 177/210 EM
[58] Field of Search .......................... 177/210 EM, 229, 177/244, 212

[56] References Cited

U.S. PATENT DOCUMENTS

| | | | |
|---|---|---|---|
| 4,798,251 | 1/1989 | Maaz et al. | 177/229 |
| 4,799,561 | 1/1989 | Komoto | 177/229 |
| 4,813,505 | 3/1989 | Södler et al. | 177/212 |
| 4,890,246 | 12/1989 | Oldendorf et al. | 177/210 EM |
| 5,315,073 | 5/1994 | Ast et al. | 177/212 |

*Primary Examiner*—Michael L. Gellner
*Assistant Examiner*—Randy W. Gibson
*Attorney, Agent, or Firm*—Eric P. Schellin

[57] ABSTRACT

A toploaded balance in accordance with the principle of the electromagnetic compensation of force with a divided upper guide rod (3, 3') and a divided lower guide rod (4, 4') which together as a parallel guide connect a load receiver (2) to a system carrier (1) fixed to the housing, which system carrier (1), load receiver (2) and guide rods (3, 3', 4, 4') form a one-piece base, with a translation lever (5) rotatably mounted by two flexible articulations (7) on the system carrier (1), with a coupling element (12) connected by flexible articulations on the one hand to the load receiver (2) and on the other hand to the short lever arm of the translation lever (5), with a magnet build, as viewed from above, into the free space between the parts of the guide rods (3, 3', 4, 4') and their extensions on the system-carrier side and with a coil fastened on the longer lever arm of the translation lever (5) and extending into the air gap of the magnet, the translation lever (5), the two flexible articulations (7) for mounting the translation lever (5) and the coupling element (12) with its flexible articulations (13, 14) are also a one-piece component of the base. In this manner errors by screwing the flexible articulations (7) and warping and non-reproducible return forces from other screw connections can be avoided.

4 Claims, 6 Drawing Sheets

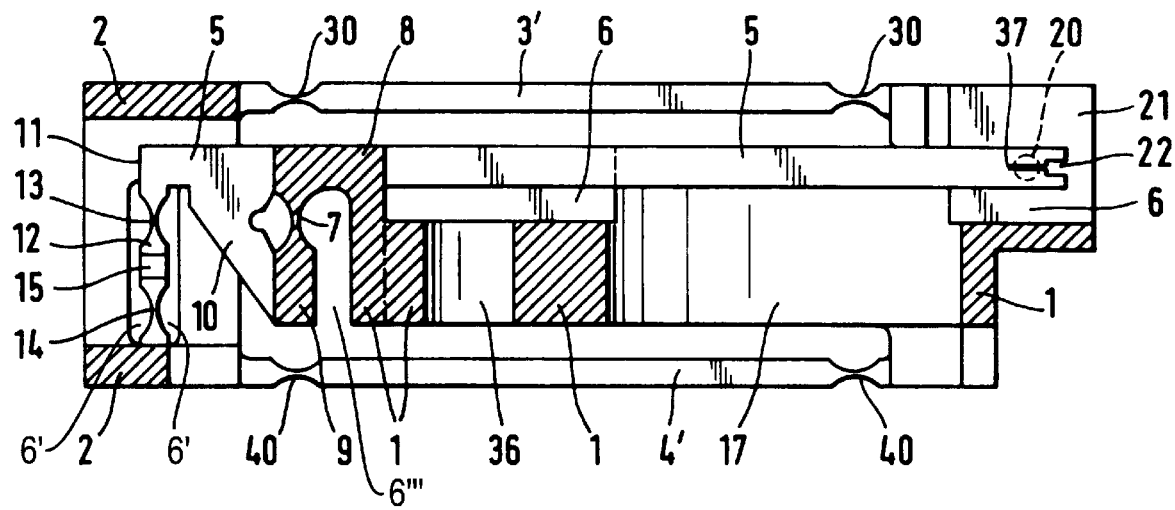
Fig. 3 (A-B)
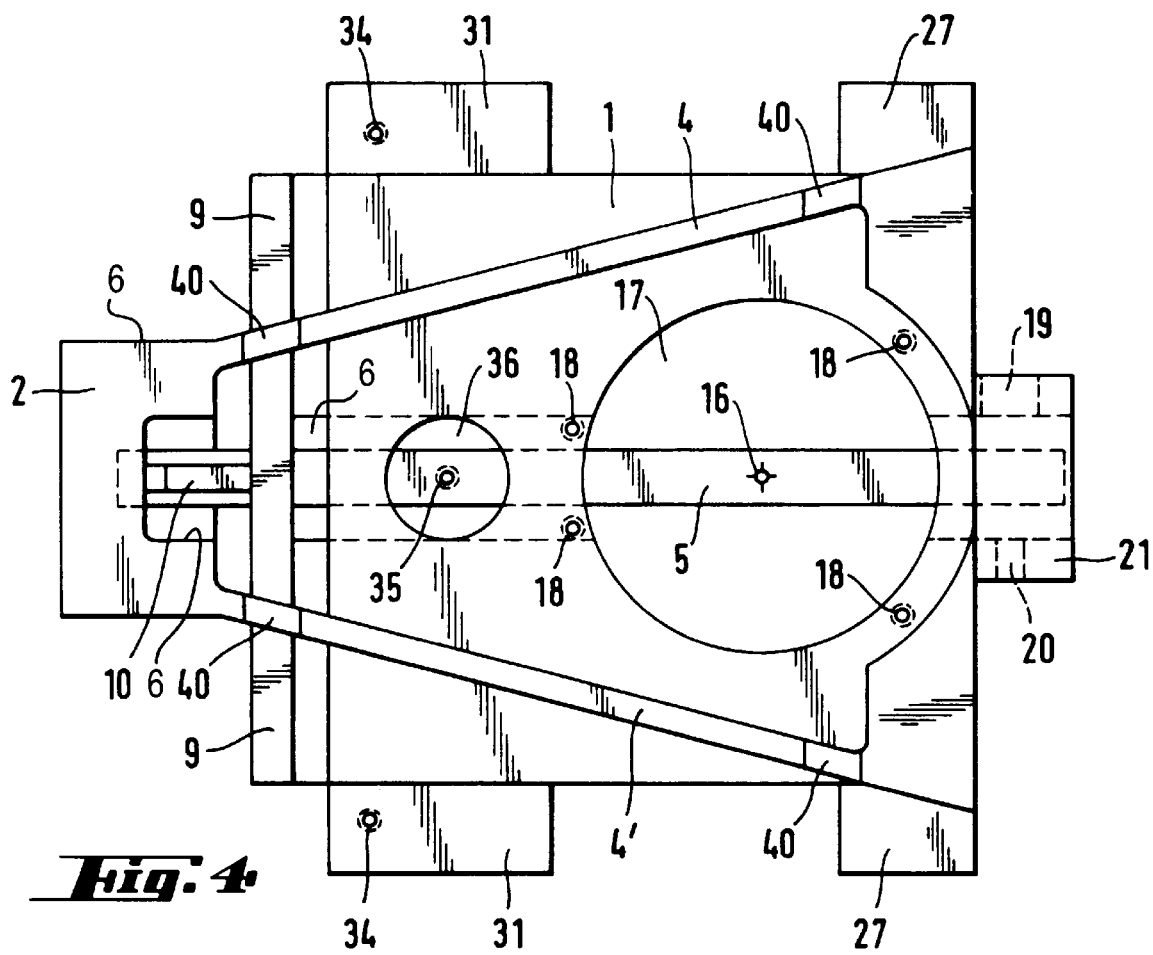
Fig. 4

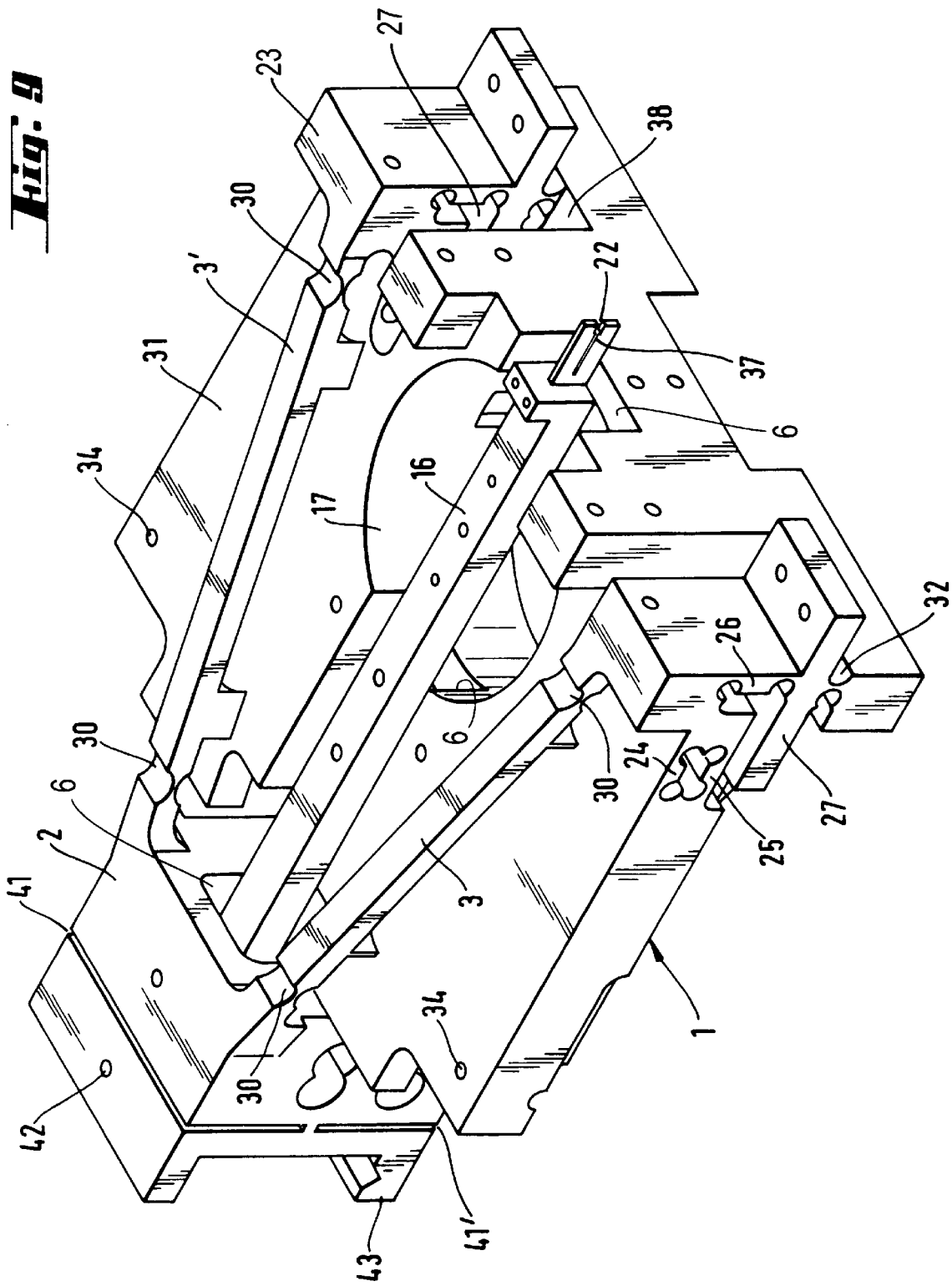

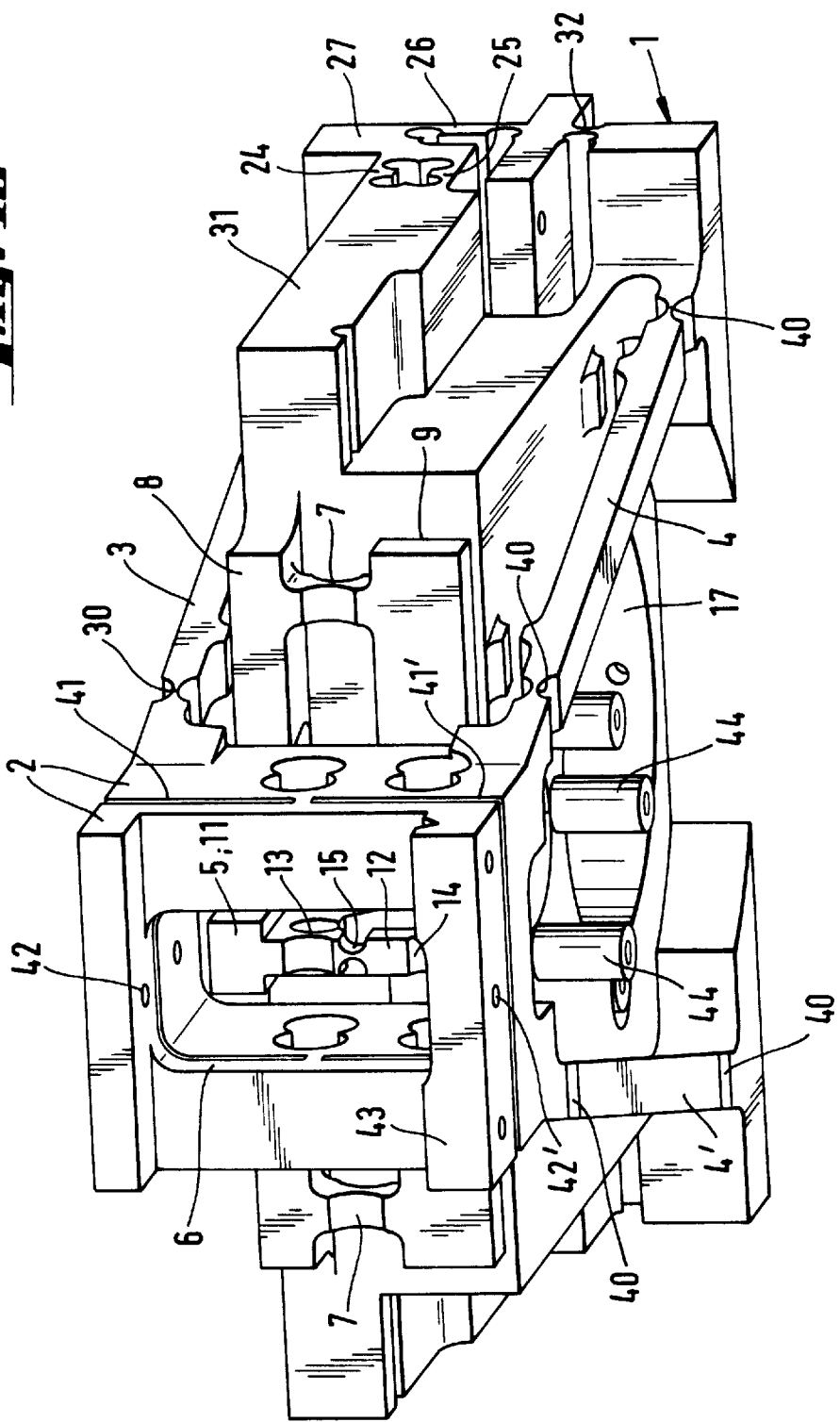

BALANCE WITH SCALE ON TOP

BACKGROUND OF THE INVENTION

The invention relates to a toploaded balance in accordance with the principle of the electromagnetic compensation of forces with a divided upper guide rod and a divided lower guide rod which together as a parallel guide connect a load receiver pan to a system carrier fixed to a housing, which system carrier, load receiver pen and guide rods form a one piece with a translation lever rotatably mounted by two flexible articulations on the system carrier, with a coupling element connected by flexible articulations on the one hand to the load receiver pan and on the other hand to the short lever arm of the translation lever, with a magnet built (viewed from above) into the free space between the parts of the guide rods and their extensions on the system-carrier side and with a coil fastened on the longer lever arm of the translation lever and extending into the air gap of the magnet, in which balance the forces corresponding to the mass of the material to be weighted is transferred from the load receiver via the coupling element onto the short lever arm of the translation lever and is compensated there by the opposing force of the coil on the longer lever arm through which coil current flows.

Balances of this type are known, g. from DE patent 34 22 042. In this embodiment the divided guide rods are arranged in a V-shape in order to transfer the torque appearing on the balance scale upon corner loading in an optimal manner onto the system carrier fixed to the housings. The flexible articulations for mounting the translation lever and the coupling element are connected by screws to the translation lever, the system carrier and the load receiver.

However, these screw connections frequently cause errors in high-resolution balances. If the screw-on surfaces for the flexible articulations are not exactly planted and/or are not exactly in alignment the thin flexible articulations are warped during assembly and alter their return forces in a non-reproducible manner. Furthermore, the play in the fastening holes of the flexible articulations can result during assembly in slight differences in height, e.g. between the two springs for mounting the translation lever. The axis of rotation of the translation lever is then no longer exactly horizontal, which results in errors when the balance is obliquely placed.

The invention therefore has the problem of solving these problems which occur during the assembly of the flexible articulations for supporting the translation lever and the coupling element, especially warp and non-reproducible return forces.

SUMMARY OF THE INVENTION

This problem is solved in a toploaded balance in accordance with the principle of the electromagnetic compensation of forces with a divided upper guide rod and a divided lower guide rod which together as a parallel guide connect a load receiver to a system carrier fixed to the housing, which system carrier, load receiver had guide rods form a one-piece base, with a translation lever rotatably mounted by two flexible articulations on the system carrier, with a coupling element connected by flexible articulations on the one hand to the load receiver and on the other hand to the short lever arm of the translation lever, with a magnet built (viewed from above) into the free space between the parts of the guide rods and their extensions on the system-carrier side and with a coil fastened on the longer lever arm of the translation lever and extending into the air gap of the magnet, in which balance the force corresponding to the mass of the material to be weighed is transferred from the load receiver via the coupling element onto the short lever arm of the translation lever and is compensated there by the counteracting force of the coil on the longer lever arm through which coil current flows. Even the translation lever, the two flexible articulations for mounting the translation lever as well as the coupling element with its flexible articulations are a one-piece component of the base and the coupling element with its flexible articulations and the translation lever with its flexible articulations are separated by slots from at least two different directions from the rest of the base.

As a result of this one-piece design and the associated manufacture from a single block, warping caused by assembly are avoided and the equality of height of the two flexible articulations for mounting the translation lever and the equality of height with the upper flexible articulation of the coupling element can be realized within the finishing accuracy. Inaccuracies of assembly above and beyond this are avoided.

If the two flexible articulations for mounting the translation lever are worked out e.g. in one work step e.g. by wire-EDM, i.e., electro-discharge machine or milling, these manufacturing tolerances are especially small. Balances with a very high reproducability can be manufactured in this manner.

A one-piece structural shape is already known in principle from EP 0,291,258 (U.S. Pat. No. 4,799,561). However, this known structural shape exhibits a two-dimensional geometry and can therefore be manufactured by wire-EDM in a single direction of working. However, as a result of this two-dimensional geometry the support basis of the guide rods is relatively narrow, so that upon an off-center loading of the balance scale in the direction vertical to the plane of the one-piece body, an overloading of the moving joints of the guide rods very rapidly occurs, which causes corner-load errors. Thus, this two-dimension a geometry is not capable of guiding a sufficiently large balance scale in parallel fashion. In contrast thereto, the invention starts from the very beginning with divided guide rods whose two parts form e.g. the shanks of a trapezoid or the shanks of a "V". This makes the stability significantly greater in comparison to the torque transferred from the balance scale. The embodiment according to EP 0,291,258 also has the disadvantage that the space available for the magnet and the translation lever is very limited. The translation lever can be at the most as long as the guide rods, so that large translation ratios requiring a large, long lever arm can not be realized. The closeness also makes it difficult to assemble coil and magnet, which must be pushed together from the side into the free space between translation lever and system carrier; then, the magnet must be connected to the system carrier and the coil to the translation lever. In contrast thereto, in the case of divided guide rods there is more space for the translation lever and the magnet and the magnet can e.g. be set in from above in DE patent 34 22 042 without the guide rods being in the way; also, the magnet can extend partially or also entirely into the area behind the moving joints of the built rods so that more structural length is available for the translation lever. In order to circumvent these problems of space in the two-dimensional structural shape, EP 0,518,202 teaches that the magnet can be arranged entirely outside of the one-piece base and the one-piece part of the translation lever can be extended by lateral arms in order to achieve the connection to the coil in the magnet. However, this only partially duplicates the functional and economical advantage of the one-piece design.

It is advantageous if the system carrier comprises an opening for the magnet into which the magnet can be inserted from below during assembly. As a result thereof, the coil can first be fastened from below on the translation lever and then the magnet is introduced from below and is fastened on the system carrier.

The adjustment of the corner load frequently takes place in the case of one-piece parallel guides by removing material in the area of the moving joints of the guide rods; this can also be included in the design of the invention. It is known in the case of parallel guides which are assembled together from individual parts that the fastening points of a guide rod which are on the system side can be made adjustable in height, e.g. using a corner-load adjustment lever like the one described in DE-GM 84 09 629. This design can also be used for the balance of the present invention, in which case the two corner-load adjustment levers are advantageously a component of the one-piece foundation. It is advantageous thereby if the wo corner-load adjustment levers run parallel to one another so that the ends of the corner-load adjustment levers for the corner-load adjustment are accessible adjacent to the guide rods running in a "V" shape. In order to avoid a tilting of the fastening points of the guide rods on the system carrier side during the corner-load adjustment these fastening points can be connected via a parallel guide to the system carrier; this parallel guide is then advantageously also a component of the one-piece base. As a result thereof this parallel guide requires no additional parts but rather only a few additional bores/millings and/or a somewhat more complicated casting form in the case of a manufacture of a cast part. It is of course also possible to employ the corner-load adjustment levers.

The flexible articulations for mounting the translation lever are advantageously subjected to tensile stress since this make thinner flexible articulations possible than would be the case with flexible articulations subject to compressive stress, which must be dimensioned against lateral buckling. In order to make this structural shape subject to tensile stress possible; the flexible articulations advantageously change upward into a projection of the system carrier and downward into a cross transverse which for its part supports the translation lever from below. These cross transverses can be dimensioned with advantage in such a manner that the center of gravity of the entire translation lever falls approximately at the level of its point of rotation.

However, even in the case of flexible articulations for the translation lever which are subject to compressive stress the center of gravity of the translation lever can be brought by an underweight into the height of its point of rotation. This underweight is advantageously connected to the translation lever by a bar, which is approximately aligned with the two flexible articulations for mounting the translation lever, and this underweight is likewise at least partially a component of the one-piece base.

In a balance in which the electromagnetic compensation of force is controlled by an optical position sensor with a slotted diaphragm located on the long lever arm of the translation lever this slotted diaphragm is advantageously also integrated in a one-piece fashion into the translation lever and the rest of the base.

During the manufacture of the balance the translation lever remains advantageously connected not only to the flexible articulations but with at least one additional bar to the system carrier in order to prevent an overloading of the thin flexible articulations This bar is advantageously not separated until after the adjustment of the position sensor for the electromagnetic compensation of force. This brings it about that the translation lever finds its normal rhythm precisely in the force-free position and the flexible articulations are not already pre-deformed As regards the manufacture of the one-piece base, advantageous possibilities have already been indicated above. It can either be manufactured from a massive metal block by wire-EDM (for all continuous cuts) and/or by milling or cavity sinking by EDM (at least for all cuts which are not continuous) this manufacturing method has the advantage that e.g. in the case of aluminum material up to strength class F53 can be used whereas in the manufacture by casting, which is otherwise also very advantageous, only material with lesser properties of strength can be used. Another advantageous method of manufacture is extrusion, which permits a shaping in one direction; the cuts in the other directions, which can be realized during casting e.g. by slides in the form, must be produced here by milling or eroding. The fact that no undercuts are necessary in the embodiment of the invention is especially advantageous for all three methods of manufacture.

The invention is described in the following using the schematic figures.

BRIEF DESCRIPTION OF THE INVENTION

FIG. 3 shows a section along line A-B in FIG. 2.

FIG. 4 shows a bottom view of the one-piece base of the balance.

FIG. 9 shows a perspective side view.

FIG. 10 shows a perspective bottom side view of a modified, one-piece base.

DETAILED DESCRIPTION OF THE DRAWINGS

Figure 1:
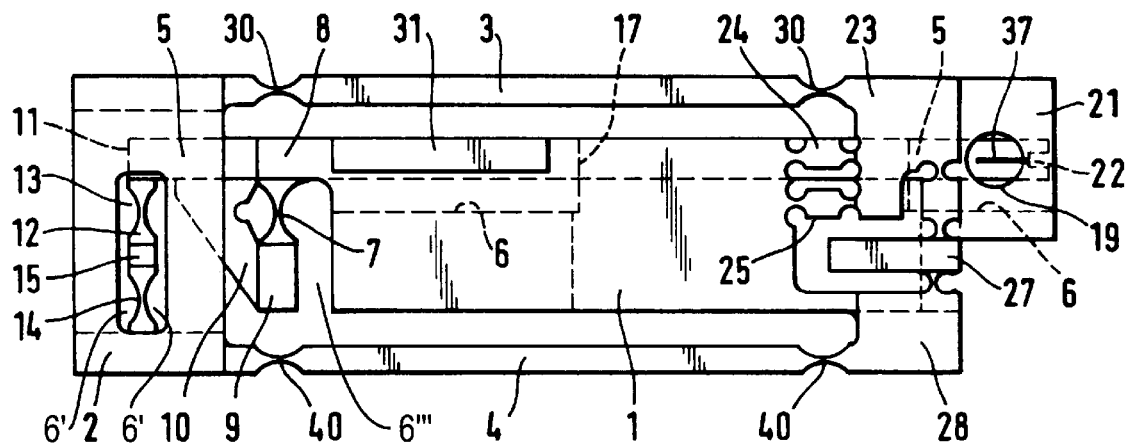
FIG. 1 shows a side view of the one-piece base of the balance.
Figure 2:
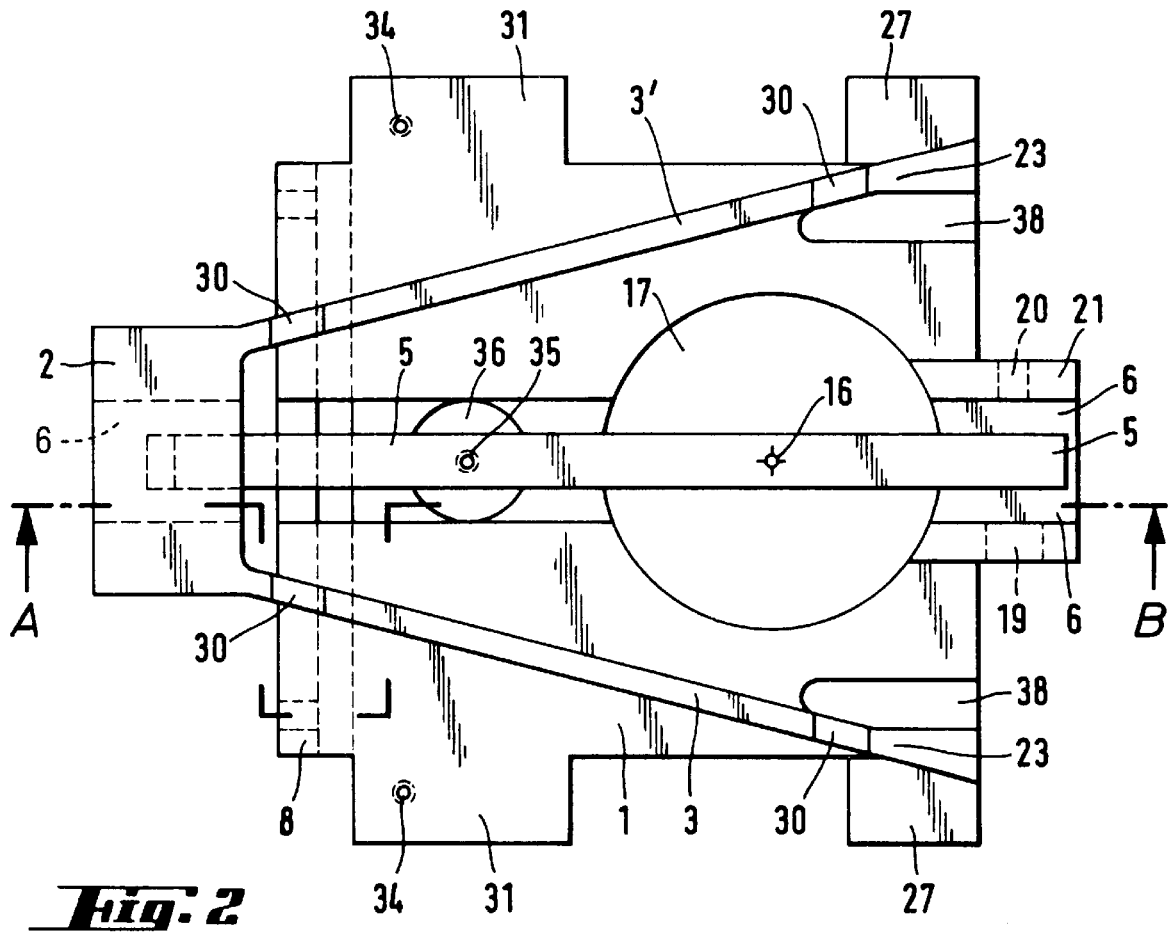
FIG. 2 shows a top view of the one-piece base of the balance.
Figure 5:
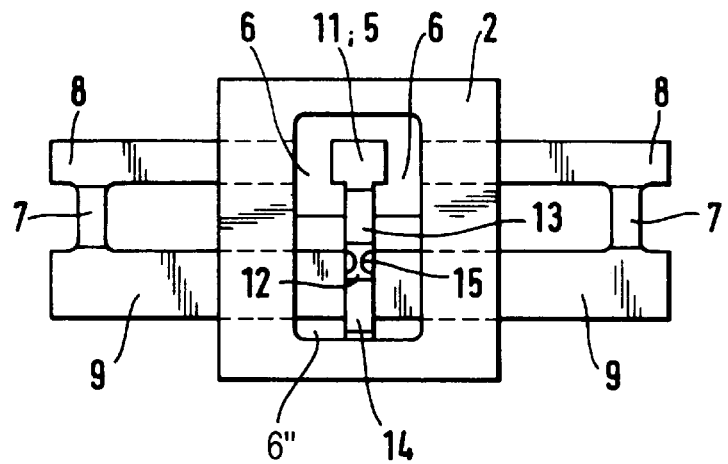
FIG. 5 shows a front view of the one-piece base of the balance.

FIGS. 1 to 5, which should be considered together, show a base for a weighing system which base is manufactured from a single piece. FIG. 1 shows it in a side view, FIG. 2 in a top view, FIG. 3 in section along ling A-B, FIG. 4 in a bottom view and FIG. 5 in a front view, in which the last-named figure only the translation lever, the coupling element and the mounting of the translation lever are shown. This base comprises a system carrier 1, an upper guide rod divided into two partial guide rods 3, 3', which comprises a lower guide rod divided in two partial guide rods 4, 4' and a load receiver 2. The two partial guide rods 3, 3' form a "V" or the shanks of a trapezoid in the top view in FIG. 2. The same applies to lower partial guide rods 4, 4' seen in the bottom view in FIG. 4. Upper and lower guide rods form a parallel guide for load receiver 2 in a known manner; thin areas 30 and 40 at the ends of the guide rods form the points of articulation. A balance scale (not shown) is fastened to load receive 2. The base also comprises translation lever 5, which is separated from system barrier 1 by trough 6, and comprises the flexible articulations for mounting translation lever 5 on system carrier 1. The position of thin areas 7 of the flexible articulations are best seen in FIGS. 3 & 5. It will be noted that in this connection that section A-B shown in FIG. 3 makes a jump in the area of the support of translation level 5, as FIG. 2 shows, for instance.

Thin areas 7 change upward into projection area 8 of system carrier 1 and downward into cross transverse 9. This cross traverse 9 carries translation lever 5 and the connection between the two is stabilized by triangular reinforcement plate 10 (FIG. 3). The connection between front end 11 of translation lever 5 (FIG. 3) and load receiver 2 takes place by means of a integrated coupling element 12. Coupling element 12 is connection in an articulated manner by upper thin area 13 to front end 11 of the translation lever and by lower thin area 14 to the lower part of load receiver 2. A further thin area 15 is located in the middle of coupling element 12 which thin area is positioned vertically to the two other thin areas 13, 14 so that a decoupling between load receiver 2 and translation lever 5 is achieved in both directions. Coupling element 12 with its flexible articulations 13, 14 and translation lever 5 with its flexible articulations 7 are practically separated from the rest of the foundation by slots 6, 6', 6", 6''' in at least two different directions.

It is emphasized that all parts of the base noted above consist of a single piece and are either worked out of a metal block by milling and/or wire-EDM or are cast as a cast part. Of course, eg. The thin areas of the flexible articulations require a subsequent working. The geometry presented avoids undercuts, so that a manufacture in accordance with one of the methods indicated above is possible without undue problems.

In order to complete the balance only one coil must be fastened from below on translation lever 5 (coil center at 16 (FIG. 2)) and a cylindrical permanent magnet inserted from below into opening 17 provided for it and fastened there. Threaded bores 18 can be recognized in FIG. 4 on the bottom which can be used both for fastening the magnet as well as for fastening the entire base to the housing. Threaded bores 18 are located at positions which are relatively uncritical so that any warping caused by the assembly have no effect at this position.

Slot 37 (FIGS. 1 and 3) of an optical position scanning is already integrated into translation lever 5. Round hole 20 (FIG. 2) is provided in projection 21 on system carrier 1 for the light-emitting diode of the optical position scanning and in the same manner round hole 19 is provided on the opposite side of projection 21 for the differential photo diode of optical position scanning.

The rather wide slot 22 (FIGS. 1 and 3) on the end of translation lever 5 serves to limit the emotion of translation lever 5. A horizontal pin (not shown) mounted eccentrically in projection 21 extends through this slot 22 and limits the motion of translation lever 5 to the difference between the slot width and the diameter of the pin.

Figure 6:
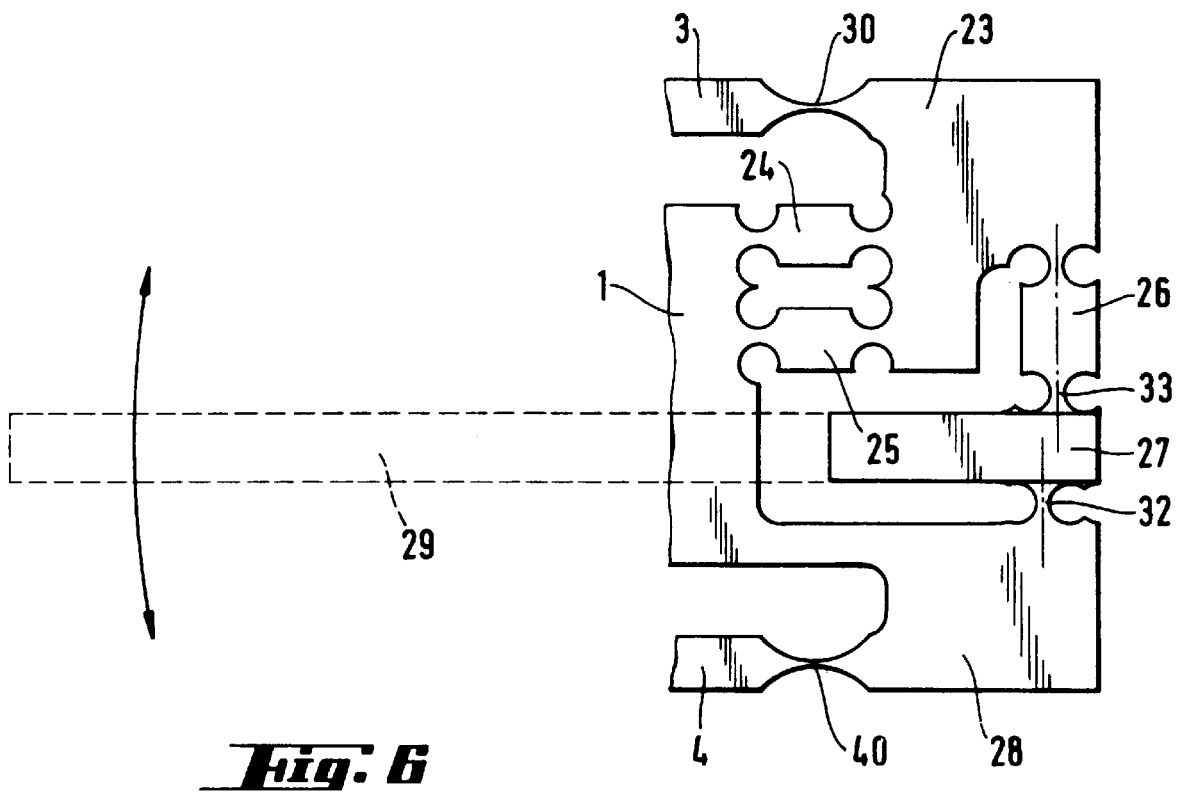
FIG. 6 shows an enlarged view of the corner-load adjustment device.

The corner-load adjustment as it can be recognized in FIG. 1 and as it is sketched out again in FIG. 6 on an enlarged scale is likewise worked out of system carrier 1 in one-piece fashion. Fastening point 23 of upper guide rod 3, 3' is connected thereby by two horizontal webs 24, 25, which form a parallel guide to the rest of system carrier 1. Area 23 is separated thereby from the rest of system carrier 1 by slot 38 (FIG. 2). Area 23 is supported via vertical web 26 and corner-load adjustment lever 27 on area 28, which is rigidly connected to system carrier 1. As a result of the lateral offset of moving joints 32, 33 a slanting of corner-load adjustment lever 27 results in a slight vertical motion of fastening point 23 for upper guide rod 3, 3'. This makes possible a sensitive shifting of the vertical integral of guide rods 3, 4 in the area of their fastening point on the system carrier side and therewith an adjustment in a known manner of the parallel guide formed by guide rods 3, 3' and 4, 4' for corner-load freedom. Corner-load adjustment lever 27, which is a one-piece component of the base, can be prolonged by separate extension 29 indicated by dots only in FIG. 6. The end of this extension 29 can then, e.g., be adjusted by a vertical screw (not shown) guided on laterally projecting lobe 31 (FIG. 2) in threaded hole 34. The corner-load adjustment can take place either by adjusting corner-load adjustment lever 27 if only a slight adjustment is necessary. A coarse adjustment is also possible in a known manner by the removal of material in the area of one of guide-rod thin areas 30 or 40, followed then by the fine adjustment by means of corner-load adjustment lever 27.

A possibility of adjusting the vertical position of the center of gravity of translation lever 5 is also provided. The center of gravity of the actual translation lever 5 is located above its center of rotation given by thin areas 7. A coarse compensation takes place by means of cross transverse 9, which is dimensioned not only according to reasons of stability but also for its function as underweight. An additional threaded rod can serve for the fine adjustment of the center of gravity of translation lever 5 into the point of rotation, which pin is adjustably guided in threaded bore 35 (FIG. 2). An opening 36 is left free in system carrier 1 for this threaded rod, which can also be made heavier, if necessary, by an additional weight.

Figure 7:
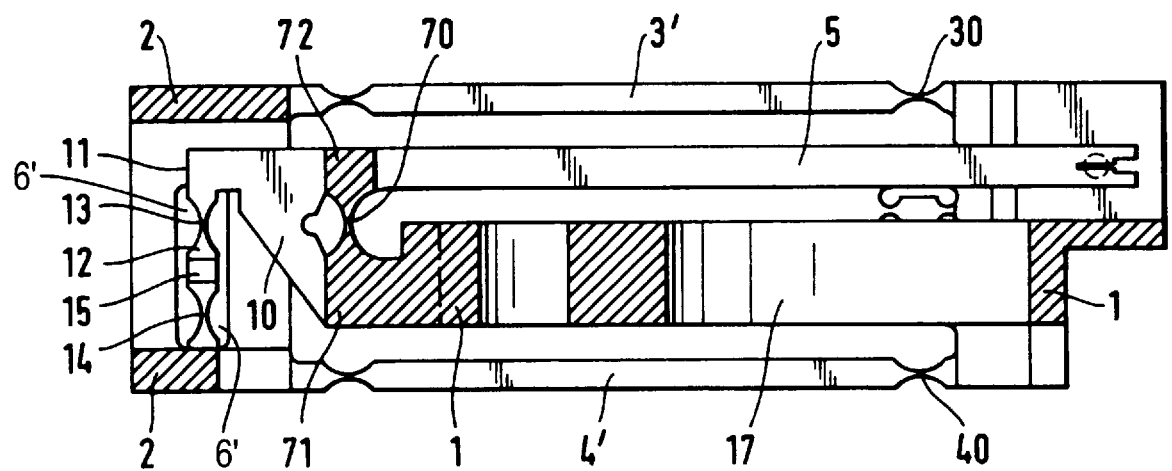
FIG. 7 shows a view in accordance with FIG. 3 in an alternative design.
Figure 8:
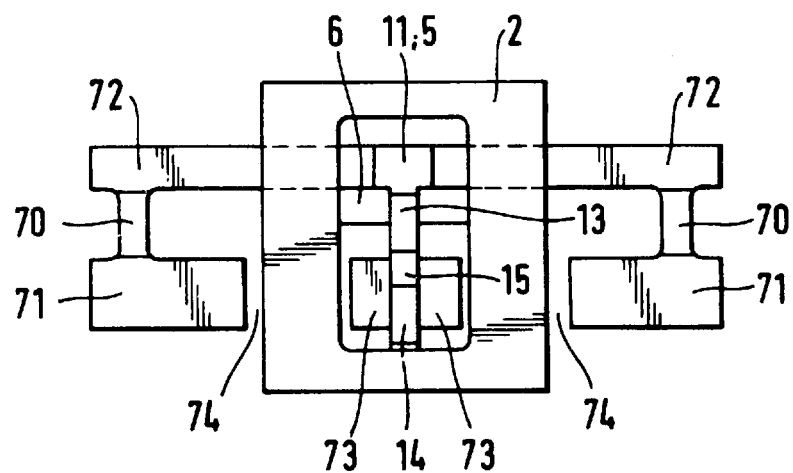
FIG. 8 shows a front view of the alternative design according to FIG. 7.

Thin areas 7 for mounting translation lever 5 are subjected to tensile stress in the present embodiment described. As a result thereof, they do not have to be dimensioned for lateral flexure and can be made correspondingly thin. However, in the case of balances without such a fine resolution, more stable thin areas 7 are also permitted which allow a compressive stress. FIGS. 7 and 8 show such an alternative design of the mounting a translation lever 5 with thin areas subject to compressive stress. FIG. 7 shows a section executed exactly as is shown in FIG. 3 and FIG. 8 shows a front view showing only the translation lever, the coupling element and the mounting of the translation lever. Aside from the mounting of the translation lever this alternative design does not differ from the embodiment already described. Therefore, the same parts are designated with the same reference numerals and are not explained again.

Translation lever 5 comprises an upper cross transverse 72 in the alternative design which is supported on system carrier 1 via thin areas 70 as pivot bearing on projections 71. Underweight 73, which is rigidly connected to translation lever 5 via a thin area aligned with thin areas 70 and via reinforcement plate 10, is located in the middle between projections 71 and aligned with the latter centrally below translation lever 5.

Underweight 73 is separated from projections 71 and system carrier 1 by slot 74, which is U-shaped as viewed from below. In this alternative embodiment too, all described areas are parts of a one-piece base and can be manufactured without undercuts.

In the embodiment according to FIGS. 9 and 10 load receiver 2 is equipped with an upper and a lower pressure-relieving slot 41, 41' running transversely to guide gods 3, 3', 4, 4'. As a result thereof, the front part of load receiver 2 which carries the balance scale on fastening point 42, is decoupled under force in the slot area from the part of the load receiver adjacent to guide rods 3, 3', 4, 4'. Therefore, any torque acting on the balance scale is not introduced into the area of guide rods 3, 3', 4, 4'. Lower pressure-relieving slot 41 decouples the front part of the load receiver upon an attack of the load from below, eg. in the case of a suspended attack of the load. Load receiver 2 has formed-on receiving bearing 43 in its lower part for a calibrating weight which can be placed on it. System carrier 1 can be screwed to a bottom plate via formed-on support elements 44.

We claim:

1. An integral one piece block means for a toploaded balance in accordance with the principle of electromagnetic compensation of force, comprising;

spaced diverging upper guide rods (3, 3');

spaced diverging lower guide rods (4, 4');

said upper and lower guide rods having first end portions, said upper and lower guide rods having second end portions, said upper guide rods and said lower guide rods being parallely displaced;

a block load receiver (2);

said divergent upper guide rods and divergent lower guide rods having their first end portions articulately connected to said block load receiver (2);

a block system carrier (1) disposed in the same plane as said block load receiver (2);

said block system carrier (1) having a first edge portion distal from said block load receiver (2);

said first edge portion of said system carrier having spaced upstanding portions;

said second end portions of said upper guide rods being articulately connected to said upstanding portions;

said first edge portion of said block system carrier having a downwardly depending portion means;

said second end portion of said lower guide rods being articulately connected to said downwardly depending portion means;

an elongated translation lever (5);

said elongated translation lever (5) having a first end and linearly displaced therefrom an intermediate portion;

said elongated translation lever terminating in a second end portion;

said load receiver (1) having an open facing recess towards said block system carrier;

said elongated translation lever (5) having said first end articulately connected in said open facing recess to said block load receiver;

said block system carrier (1) having an elongated slot extending between said first edge portion and an oppositely displaced second edge portions;

said intermediate portion of said elongated translation lever (5) being articulately connected to said second edge portion of said block system carrier (1);

said second end portion of said elongated translation lever extending in said slot in said block system carrier, between said diverging upper guide rods and between said upstanding portions of said block system carrier (1).

2. The integral one piece block means of claim 1 wherein the articulate connections are weakened portions.

3. The integral one piece block means of claim 1 wherein the block system carrier has an opening therethrough adapted and constructed to house a electromagnetic means operatively positioned with respect to said translation lever (5).

4. The integral one piece block means of claim 2 wherein the said weakened portions, said spaced diverging upper guide rods, said spaced diverging lower guide rods, said block load receiver, said block system carrier and said translation lever are all machined from a single block of metal.

* * * * *